G. A. Jasper.
Sugar Sifter.

No. 91,850. Patented Jan. 29, 1869.

Witnesses:
W. W. Ivan
C. W. Barnes.

Inventor:
Gustavus A. Jasper

United States Patent Office.

GUSTAVUS A. JASPER, OF CHARLESTOWN, MASSACHUSETTS.

Letters Patent No. 91,850, dated June 29, 1869.

IMPROVED SUGAR-SIFTER.

The Schedule referred to in these Letters Patent and making part of the same.

*To all whom it may concern:*

Be it known that I, GUSTAVUS A. JASPER, of Bremen, in Germany, now residing in Charlestown, in the State of Massachusetts, have invented an Apparatus for Sifting Sugar and Similar Articles, of which the following is a description, reference being had to the accompanying drawings, in which—

Figure 1:
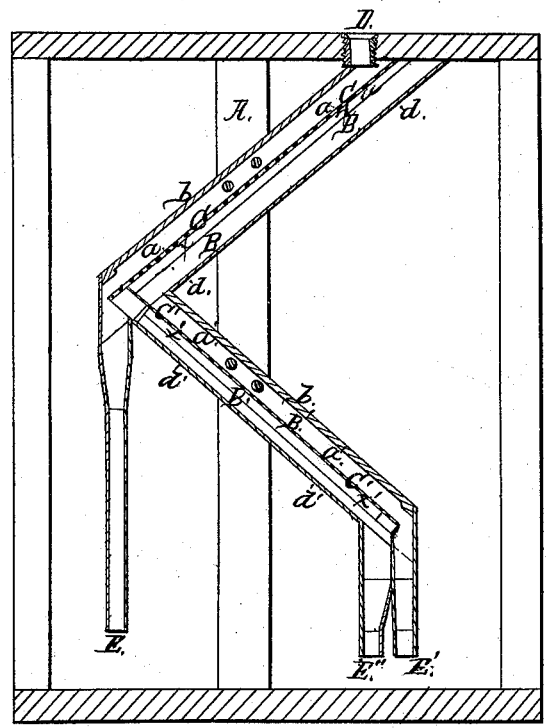
Figure 2:
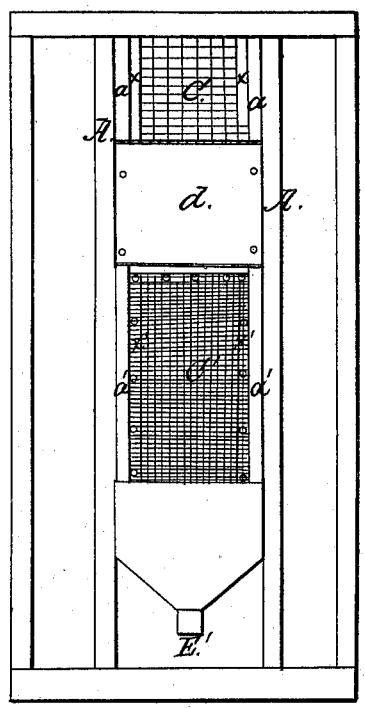

Figure 1 is a vertical section of my apparatus.
Figure 2 is an end view, with parts removed.

My invention consists in the construction and arrangement of a succession of sieves and channels, whereby sugar or a similar article may be sifted and discharged, without other labor or power than that required to introduce it into the apparatus.

This invention is particularly adapted for use in the sugar-refinery, where sugar has hitherto been sifted by sieves having a regular reciprocal motion. The use of these vibrating sieves, however, is attended with difficulties. Machinery and power are required to work them; they create dust; sugar is left upon them when they are stopped, which cannot be got at without much trouble; and they take up much room. My apparatus, on the contrary, requires no machinery. No dust arises from it when in use. Sugar once turned into it, cannot rest in inaccessible places, but is sifted and discharged. It occupies but little room.

I proceed to describe the construction and operation of my invention.

A A are two upright posts.

B and B' are long, narrow, and shallow boxes, secured, through their sides $a$ $a'$, to the posts, substantially as shown in fig. 1.

In each of these boxes, at about an equal distance from the top and the bottom, there is a wire sieve, of the length and breadth of the box, as shown, the sieve in box B having coarser meshes than the sieve in box B'. These sieves are marked C and C'.

The tops of the boxes, marked $b$ $b'$, are movable.

The bottoms, or floors of the boxes, marked $d'$ $d'$, are smooth, to allow the sugar or other similar article to slide freely upon them. I prefer to make the bottoms of metal, the sides and tops being of wood.

With the sides of the boxes, the bottoms form channels, by which the crystals, or grains that pass through one sieve may be conducted to the next. Each sieve is thus combined with a channel.

The boxes are fastened to the posts at such an angle that the article to be sifted, falling upon the upper end of the sieve, slides freely, yet slowly, to the lower end.

D is a pipe, through which sugar falls into the sifter from the drying-apparatus.

The box B is closed at the upper end. The lower end is open, the part above the sieve opening into the tunnel E, while the part underneath the sieve opens into the box B', as shown.

At the lower end of the box B' are two tunnels, E' and E'', the former connected with the division of the box above the sieve, and the latter connected with the part of the box, or channel, under the sieve.

Each sieve is about six feet long, and a little over a foot wide. The boxes are eight inches deep.

The sieves may be fastened into the boxes in any suitable manner. I have fastened them to frames, $x$, and have set the frames into the boxes, as shown.

The spaces between the boxes being left open, as shown, the apparatus may be placed by the side of the building, near the windows, without obstructing, in a great degree, the light.

Instead of allowing the sugar which passes through the sieve C' to fall into the tunnel E'', a third box and sieve, with corresponding tunnels, may be added to the apparatus, and the sugar, now discharged through E, be subjected to another sifting.

The channel for the last sieve is connected with a discharge-tunnel.

The following is the operation of this apparatus as applied to sifting sugar:

The upper sieve is in the story of the refinery which is next below the drying-apparatus. Sugar, coming in a steady stream from the drier, through the pipe D, falls upon the sieve C, where its course is turned, and it slides upon the sieve toward the lower extremity. As it passes along the sieve, the finer crystals pass through the meshes. Such crystals as do not pass through, fall into the tunnel E, and are conducted to a barrel in the packing-room.

The crystals that pass through the meshes of the sieve fall upon the bottom of the box B, and slide to the lower end, where they strike against the sieve C'. In the same manner, a part of the sugar passes over the sieve C' into the tunnel E', and the rest passes through the meshes, falling upon the bottom of the box B', and sliding into the tunnel E''.

I claim a succession of sieves, combined with channels, set up at such angles, with respect to each other, that sugar or similar articles will slide freely from one end to the other of each sieve and channel, and be sifted and discharged, substantially as herein described.

The above specification of my said invention signed and witnessed at Boston, this 22d day of May, A. D. 1869.

GUSTAVUS A. JASPER.

Witnesses:
W. W. SWAN,
C. W. BARNES.